(12) United States Patent
Banerjee (10) Patent No.: US 10,609,216 B1
(45) Date of Patent: Mar. 31, 2020

(54) METHOD AND SYSTEM FOR OPTIMIZING CALL DISTRIBUTION AMONG CALLERS FOR IMPROVED POSITIVE OUTCOME

(71) Applicant: Wipro Limited, Bangalore (IN)

(72) Inventor: Sourish Banerjee, London (GB)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/542,380

(22) Filed: Aug. 16, 2019

(30) Foreign Application Priority Data

Jun. 27, 2019 (IN) .............................. 201941025590

(51) Int. Cl.
| | |
|---|---|
| *H04M 3/51* | (2006.01) |
| *G10L 15/16* | (2006.01) |
| *G06N 3/08* | (2006.01) |
| *G10L 15/22* | (2006.01) |
| *G10L 15/18* | (2013.01) |

(52) U.S. Cl.
CPC ............ *H04M 3/5158* (2013.01); *G06N 3/08* (2013.01); *G10L 15/16* (2013.01); *G10L 15/1815* (2013.01); *G10L 15/22* (2013.01); *H04M 2203/407* (2013.01)

(58) Field of Classification Search
CPC .......... H04M 3/5158; H04M 2203/407; G10L 15/16; G06N 3/08
USPC .......... 379/309, 265.01, 265.02, 265.05, 308
See application file for complete search history.

(56) References Cited

U.S. PATENT DOCUMENTS

| 9,338,289 B1* | 5/2016 | Goyal ..................... G06F 16/29 |
| 2008/0008309 A1* | 1/2008 | Dezonno ............. H04M 3/5232 |
| | | 379/265.02 |
| 2015/0043726 A1* | 2/2015 | Steiner ................ H04M 3/5233 |
| | | 379/265.12 |

FOREIGN PATENT DOCUMENTS

CN       108965620 A       12/2018

OTHER PUBLICATIONS https://blog.aimultiple.com/intelligen-cal-routing/, "Intelligent Call Routing: In-depth Guide [2019 update]" AI Multiple, Jan. 1, 2019, pp. 1-12.
https://leadassign.com, "How Industry Leading Enterprises Manage, Route and Close Leads", leadassign, 2019, pp. 1-4.

* cited by examiner

*Primary Examiner* — Thjuan K Addy
(74) *Attorney, Agent, or Firm* — Finnegan, Henderson, Farabow, Garrett & Dunner, LLP (57) ABSTRACT

A method and a system of optimizing call distribution among callers for improved positive outcome is disclosed. In an embodiment, the method may include receiving at least one attribute associated with one or more callers, and at least one attribute associated with one or more callees. The method may further include calculating an overall cost associated with each of the one or more callers with respect to each of the one or more callees, based on the at least one attribute associated with the one or more callers and the at least one attribute associated with the one or more callees, using an Artificial Intelligence (AI) model. The method may further include allocating a caller to a callee based on the overall cost.

16 Claims, 6 Drawing Sheets

METHOD AND SYSTEM FOR OPTIMIZING CALL DISTRIBUTION AMONG CALLERS FOR IMPROVED POSITIVE OUTCOME

TECHNICAL FIELD

This disclosure relates generally to call distribution, and more particularly to a method and a system of optimizing call distribution among callers for improved positive outcome.

BACKGROUND

Tele-calling is an integral feature of tele-marketing, through which sales agents (callers) make sales calls to targeted customers (callees) for promoting or selling products to these targeted customers. The sales agent may persuade a targeted customer to agree to buy a product, via verbal communication over the sales call. It may be understood that there may be various different responses and reactions of the targeted customer towards the sales call. These different responses and reactions may lead to multiple outcomes of the sales call. For example, the multiple outcomes may include the targeted customer buying the product, the targeted customer showing interest but needing asking for more information about the product, the targeted customer not showing interest, the targeted customer showing interest but unable to purchase the product, etc. The multiple outcomes may vary depending on various factors including nature of the product, strategy of sales and marketing, availability of customer's time for the sales call, and the like.

It may be understood that the outcome of the sales call (also, referred to herein as "event") may be stochastic in nature, as responses of the targeted customers may be unpredictable. This stochastic nature may have a bearing on reaching a positive outcome of the event (for example, the positive outcome may be the customer to buy the product). As such, there may not be any straight-forward rules to obtain the positive outcome.

In practice, a multiple number of customers (potential leads) may be distributed to a group of sales agents in a random manner. However, the random distribution of the customers may result in suboptimal outcome of the sales call due to stochasticity. As it will be appreciated by those skilled in that art, costs associated with sales agents may vary depending on experience and skillsets (of persuading the targeted customers to buying a product) of the sales agents. For example, cost to company may be significantly high for highly experienced and skilled sales agents. Therefore, using such sales agents for not so important sales calls may not be a wise strategy, and may affect revenues of an organization employing these sales agents.

SUMMARY

In one embodiment, a method of optimizing call distribution among callers for improved positive outcome is disclosed. The method may include receiving at least one attribute associated with one or more callers, and at least one attribute associated with one or more callees. The method may further include calculating an overall cost associated with each of the one or more callers with respect to each of the one or more callees, based on the at least one attribute associated with the one or more callers and the at least one attribute associated with the one or more callees, using an Artificial Intelligence (AI) model. The method may further include allocating a caller to a callee based on the overall cost associated with each of the one or more callers with respect to each of the one or more callees.

In another embodiment, a call distribution optimization device for optimizing call distribution among callers for improved positive outcome is disclosed. The call distribution optimization device includes a processor and a memory communicatively coupled to the processor. The memory stores processor-executable instructions, which, on execution, may cause the processor to receive at least one attribute associated with one or more callers, and at least one attribute associated with one or more callees. The processor instructions, on execution, may further cause the processor to calculate an overall cost associated with each of the one or more callers with respect to each of the one or more callees, based on the at least one attribute associated with the one or more callers and the at least one attribute associated with the one or more callees, using an AI model. The processor instructions, on execution, may further cause the processor to allocate a caller to a callee based on the overall cost associated with each of the one or more callers with respect to each of the one or more callees.

In yet another embodiment, a non-transitory computer-readable storage medium is disclosed. The non-transitory computer-readable storage medium has stored thereon, a set of computer-executable instructions causing a computer comprising one or more processors to perform steps including receiving at least one attribute associated with one or more callers, and at least one attribute associated with one or more callees; calculating an overall cost associated with each of the one or more callers with respect to each of the one or more callees, based on the at least one attribute associated with the one or more callers and the at least one attribute associated with the one or more callees, using an AI model; and allocating a caller to a callee based on the overall cost associated with each of the one or more callers with respect to each of the one or more callees.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
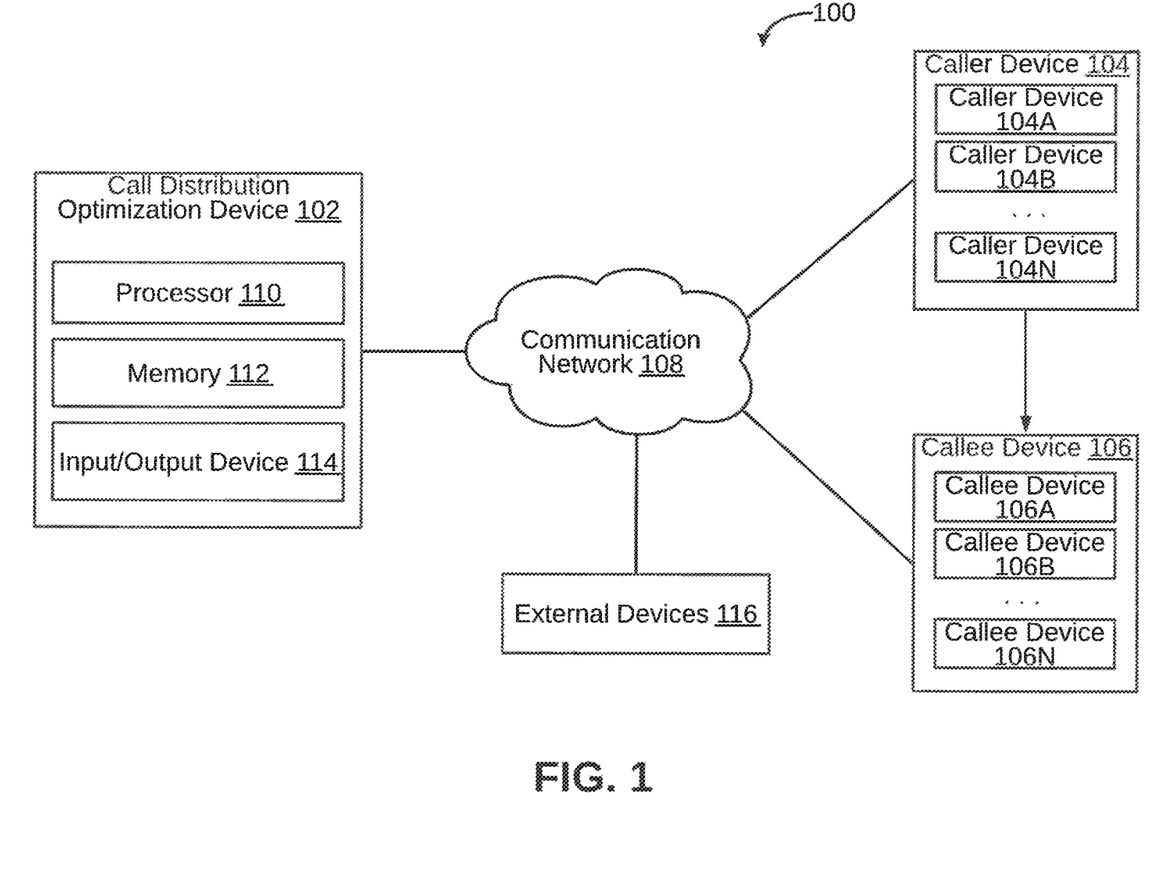
FIG. 1 illustrates a system for optimizing call distribution among callers for improved positive outcome, in accordance with an embodiment.

In one embodiment, a system 100 for optimizing call distribution among callers for improved positive outcome is illustrated in the FIG. 1, in accordance with an embodiment. The system 100 may include a call distribution optimization device 102, a caller device 104A, a caller device 104B . . . a caller device 104N (hereinafter, each referred to as caller device 104) and a callee device 106A, a callee device 106B . . . a callee device 106N (hereinafter, each referred to as callee device 106). It may be understood that the each caller device 104 may be associated with a caller, for example a sales agent (also, referred to as "agent" in this disclosure) of a tele-marketing company. Further, each callee device 106 may be associated with a callee, for example a target customer (also, referred to as "customer" in this disclosure) the sales agent may be trying to sell a product to. It may be noted that the positive outcome may include a caller successfully persuading a callee to buy products of the caller. The call distribution optimization device 102 may be a computing device having ability of optimizing call distribution among callers. Examples of the call distribution optimization device 102 may include, but are not limited to a server, a desktop, a laptop, a notebook, a netbook, a tablet, a smartphone, a mobile phone, an application server, a sever, or the like. The caller device 104 may be a computing device having a capability of establishing a voice call with a callee device 106. The caller device 104 and the callee device 106 may be communicatively coupled to the call distribution optimization device 102 via a communication network 108, The communication network 108 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), General Packet Radio Service (GPRS), and Global System for Mobile Communications (GSM).

As will be described in greater detail in conjunction with FIG. 2 to FIG. 5, in order to optimize call distribution among callers for improved positive outcome, the call distribution optimization device 102 may receive at least one attribute associated with one or more callers, and at least one attribute associated with one or more callees. The call distribution optimization device 102 may further calculate an overall cost associated with each of the one or more callers with respect to each of the one or more callees, based on the at least one attribute associated with the one or more callers and the at least one attribute associated with the one or more callees, using an Artificial Intelligence (AI) model. The call distribution optimization device 102 may further allocate a caller to a callee based on the overall cost associated with each of the one or more callers with respect to each of the one or more callees.

In order to perform the above discussed functionalities, the call distribution optimization device 102 may include a processor 110 and a memory 112. The memory 112 may store instructions that, when executed by the processor 110, cause the processor 110 to optimize call distribution among callers for an improved positive outcome, as discussed in greater detail in FIG. 2 to FIG. 5. The memory 112 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM), The memory 112 may also store various data (e.g., caller attributes data, callee attributes data, overall cost data, propensity score data, effective skillset (of callers) data, effective experience (of callers) data, Artificial Neural Network (ANN) model, Natural Language Processing (NLP) model, Natural Language Generation (NLG) model, conversation template, etc.) that may be captured, processed, and/or required by the system 100.

The call distribution optimization device 102 may further include one or more input/output device 114 through which the call distribution optimization device 102 may interact with a user and vice versa. By way of an example, the input/output device 114 may be used to render a conversation template for assisting the caller in achieving an objective of the conversation. The system 100 may interact with one or more external devices 116 over the communication network 108 for sending or receiving various data. Examples of the one or more external devices may include, but are not limited to a remote server, a digital device, or another computing system.

Figure 2:
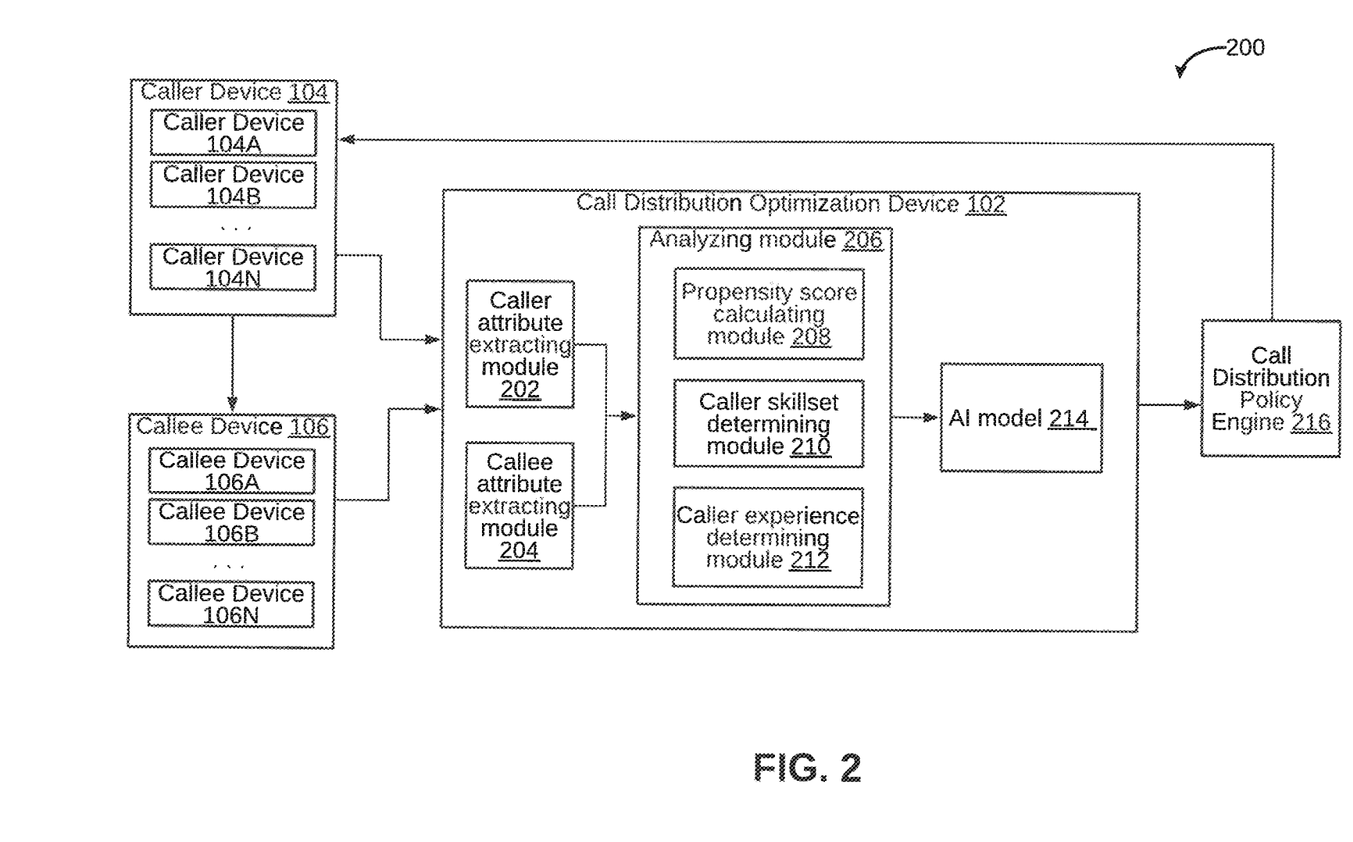
FIG. 2 is a functional block diagram of a system for optimizing call distribution among callers for improved positive outcome, in accordance with an embodiment.

Referring now to FIG. 2, a functional block diagram of a system 200 (analogous to the system 100) for optimizing call distribution among callers for improved positive outcome is illustrated, in accordance with an embodiment. The system 200 may include the call distribution optimization device 102, the caller device 104, and the callee device 106. The system 100 may further include an optimized call distribution policy module 216. In some embodiments, each caller device 104 may include information of a respective caller, and each callee device 106 may include information of a respective callee. For example, each caller device 104 may include information about potential leads (callees) for the caller. These potential leads may be determined based on behavioral pattern of the callees.

The call distribution optimization device 102 may receive the caller data and the callee data, and extract one or more parameters from the caller data and the callee data. By way of an example the one or more parameters may include a propensity score of a callee, a skillset of a caller, and an experience of the caller. In some embodiments, the call distribution optimization device 102 may calculate a value for each of the one or more parameter. The values for each of the one or more parameters may be later used to determine cost of customer acquisition.

The call distribution optimization device 102 may include a caller attribute extracting module 202, a caller attribute extracting module 204, an analyzing module 206, and an AI model 214. The analyzing module 206 may include a propensity score calculating module 208, a caller skillset determining module 210, and a caller experience determining module 212.

The caller attribute extracting module 202 may receive caller data related to the callers. In some embodiments, the caller attribute extracting module 202 may receive the caller data fro the caller device 104. By way of an example, the caller data may include dialogues of the callers, performance of the callers, and the like. The dialogues may include behavior of the callers in persuading the callees for purchasing products. The callee attribute extracting module 204 may receive callee data related to the callees. In some embodiments, the callee attribute extracting module 204 may receive the callee data from the callee device 106. By way of an example, the callee data may include callee details (for example, personal details of the callee), historical conversation of the callees, callees' interests, and the like. In some embodiments, the analyzing module 206 may calculate a likelihood of a callee in purchasing products being marketed by the caller. The analyzing module 206, is further explained in detail in conjunction with FIG. 3.

Figure 3:
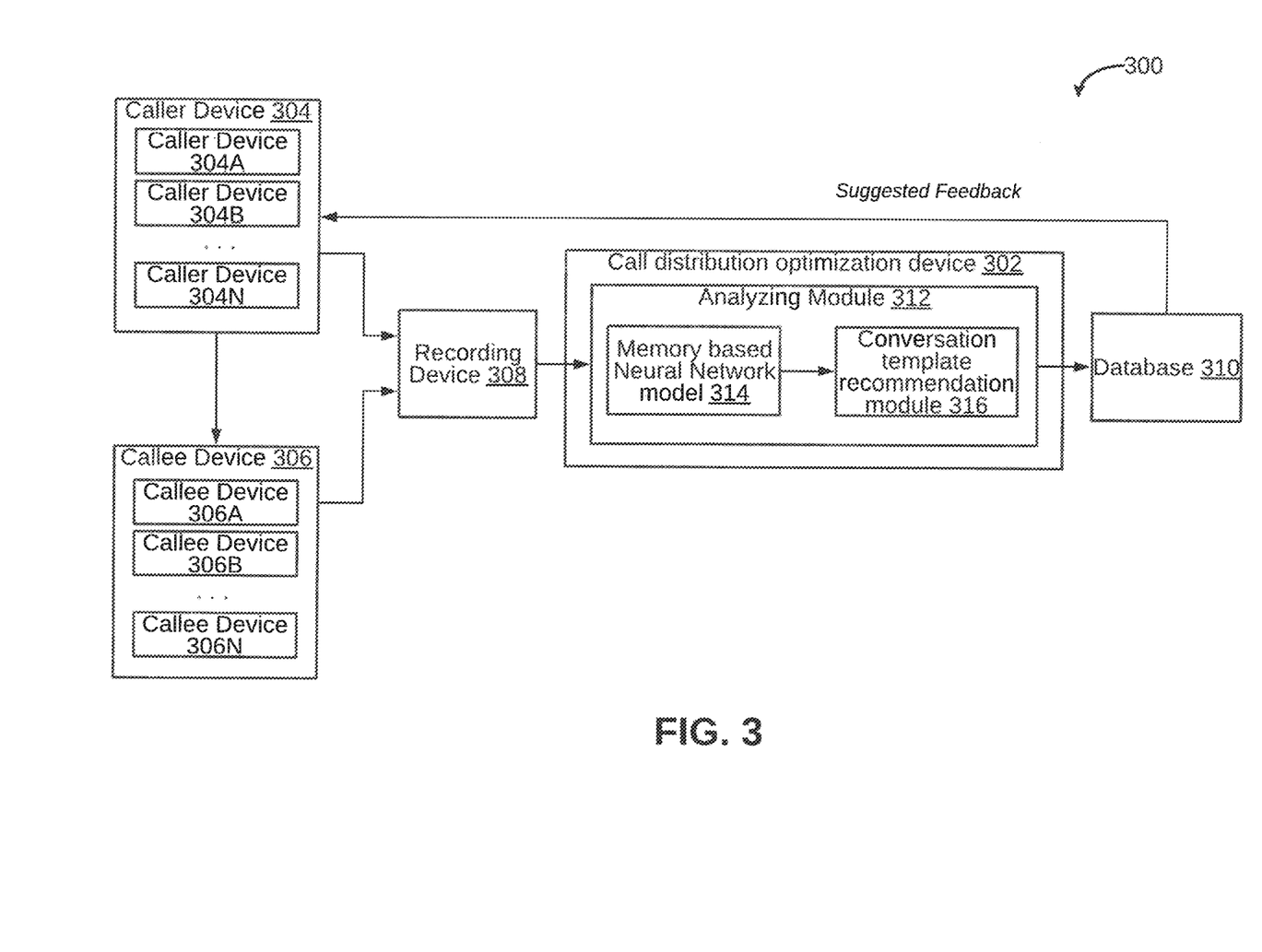
FIG. 3 is a functional block diagram of a system a system for optimizing call distribution among callers for improved positive outcome, in accordance with another embodiment.

Referring now to FIG. 3, a functional block diagram of a system 300 (analogous to the system 100 and system 200) of optimizing call distribution among callers for improved positive outcome is illustrated, in accordance with another embodiment. The system 300 may include a caller device 304A, a caller device 304B . . . a caller device 304N (hereinafter, each referred to as caller device 304) and a callee device 306A, a callee device 306B . . . a callee device 306N (hereinafter, each referred to as callee device 306). The system 300 may further include a call distribution optimization device 302, a recording device 308, and a recording storage (not shown in FIG. 3). The call distribution optimization device 302 may include an analyzing module 312. The analyzing module 312 may include a memory based neural network model 312 and a conversation template recommendation module 314.

As already mentioned earlier, the caller may be a sales agent within a tele-marketing agency (for example, a call center) who may initiate a sales call with a callee (a targeted customer). Once the sales call is established, the caller and the callee may be engaged in a two-way conversation. In some embodiments, the recording device 308 may record the two-way conversation between the caller and the callee, and store the recorded two-way conversation in the recording storage. It may be noted that the two-way conversation may be stored for future training and analysis purpose.

The analyzing module 312 may analyze the two-way conversation in real time. In particular, the memory based neural network model 312 may process the two-way conversation in real time i.e. as and when the two-way conversation takes place. In some embodiments, the memory based neural network model 312 may process the two-way conversation using Natural Language Processing (NLP). In some embodiments, the memory based neural network model 312 may include an attention based Long Short-Term Memory Network (LSTM). Upon processing the two-way conversation, the memory based neural network model 312 may create one or more temporal goal-specific intents. By way of an example, these one or more temporal goal-specific intents may be created to calculate instantaneous probability (i.e., probability at that instance) of the callees user to buy the product the caller is selling.

The conversation template recommendation module 316 may receive the temporal goal specific intents and the probability. The conversation template recommendation module 316 may suggest a conversation template for a next time step. In some embodiments, personalized conversation templates for any given instance may be generated using Natural language Generation (NLG) techniques. The suggested conversation templates generated by the conversation template recommendation module 316 may be collected as a list of suggested conversation templates in a database 310. The suggested conversation template may be provided to the caller to steer the ongoing conversation accordingly with the callee.

It may be understood that during a two-way conversation, the caller may decide to follow or not follow the suggested conversation template, based on the caller's judgment of the situation. In cases, when the caller does not follow the suggested conversation template, the quality of the suggestion may need improvement. By way of an example, the quality of the suggestion may be improved based on changes in the intent and probability score after a next timestep of the conversation batch processing. In some embodiments, the AI model 214 may learn and improve the conversation with the user. Further, in some embodiments, the AI model 214 may learn through an exploration vs exploitation dilemma. For example, the AI model 214 may learn from the improvised conversation of the caller with a callee, after the caller has decided to not follow the suggested conversation template. In other words, the AI model 214 may be trained on such improvised conversation. Accordingly, the conversation template recommendation module 316 may generate improved conversation templates in subsequent two-way conversations, based on the learning of the AI model 214.

Returning back to FIG. 2, the propensity score calculating module 208 may calculate a propensity score based on the likelihood of the callee in purchasing products, calculated by the analyzing module 206. As such, the propensity score may denote likelihood of a callee buying a product being sold by the caller. Accordingly, a higher propensity score may indicate a higher likelihood (or probability) of the callee buying the product of the caller. The propensity score calculating module 208 may provide the propensity score to the AI model 214. The caller skillset calculating module 210 may calculate skillsets of the callers, based on the caller data, and may provide the skillsets of the callers to the AI model 214. The caller experience determining module 212 may calculate experiences of the callers, based on the caller data, and may provide the experiences of the callers to the AI model 214.

As mentioned above, the AI model 214 may receive the propensity score, the skillset and the callers, and the experience of the callers. It may be noted that the AI model 214 may be configured to minimize the overall cost associated with each of the one or more callers with respect to each of the one or more callees, using the propensity score, the skillset and the callers, and the experience of the callers. Accordingly, the AI model 214 may allocate a caller to a callee based on the overall cost associated with each of the one or more callers with respect to each of the one or more callees, with an objective of minimizing the overall cost associated with each of the one or more callers with respect to each of the one or more callees. In some embodiments, the AI model 214 may be based on reinforcement learning. For example, the AI model 214 may allocate a highly skilled (therefore expensive) caller to a callee who may be difficult to convince. On the other hand, the AI model 214 may allocate a low or medium skill level (therefore cheaper) caller to a callee who may be easy to convince.

In some embodiments, the AI model 214 may optimize the customer-agent allocation, based on cost of customer acquisition. The cost of customer acquisition can be denoted by a function of associated cost of agents and miscellaneous costs (the miscellaneous costs may not be related to the agent). By way of an example, the function of the associated cost (C) of an agent may be mathematically expressed as follows:

$$C=f(P,S,E)$$

where,
C=cost of customer acquisition,
P=customer propensity score,
S=assigned agent's skillset, and
E=assigned agent's related experience.

It may be noted that the cost of customer acquisition may be minimized to increase profit of an agency associated with the agent (for example, a tele-marketing agency). The end objective may be denoted as the function expressed in the following:

$$\text{End Objective} = \min \sum_{l}^{L} (C_l) \qquad \text{Equation (1)}$$

where,
l∈L;
L is list of the customers; and
$C_l$ is cost of acquiring a customer A binary variable, which may signify whether an agent is assigned to a customer, may be denoted as follows:

$$\text{Binary value} = X_{a,l} \qquad \text{Equation (2)}$$

where,
a∈A,
A is the set of agents available for assignment; and
l∈L

Upon combining the equation 1 and equation 2, cost of customer acquisition ($C_l$) may be calculated as follows:

$$C_l = \sum_{a}^{A} (f(P_l, S_{a,l} * X_{a,l}, E_{a,l} * X_{a,l})) \qquad \text{Equation (3)}$$

where,
$C_l$ is cost of customer acquisition;
$P_l$ is propensity score of customer;
$S_a$, l effective skillset of agent assigned with customer;
$E_a$, l is an effective related experience of agent assigned with customer Using the equations (2) and (3), a new objective function may be determined as follows:

$$\min \sum_{l}^{L} \sum_{a}^{A} (f(P_l, S_{a,l} * X_{a,l}, E_{a,l} * X_{a,l})) \qquad \text{Equation (4)}$$

It may be noted that based on the values of $P_l$, $S_{a,l}$ and $E_{a,l}$, the overall cost associated with each of the one or more callers with respect to each of the one or more callees may be minimized. For example, using data from a call center (a tele-marketing agency), a necessary function consisting of $P_l$, $S_{a,l}$ and $E_{a,l}$ may be created.

In some embodiments, data related to conversation between the callers and callees may be stored for training and analysis purpose. The analyzing module 206 may derive and memorize current intent from the conversation in a recent timeframe. The analyzing module 206 may further predict a probability of achieving an end objective of the call based on the intent of the conversation's previous timesteps. The analyzing module 206 may further suggest possible intent based conversation template in real-time to the caller. The conversation template may be used by the caller to steer the conversation with the callee, accordingly.

In some embodiments, the analyzing module 206 may perform a real-time intent analysis of conversations between the caller and the callee. The analyzing module 206 may memorize the current intent of the conversation occurred in a recent timeframe. Based on the intent, a probability of achieving the end objective of the event can be calculated. By way of an example, a conversation may continue between a caller and a callee for time 'T'. The time 'T' may be split into smaller time batches 't'. The intent/($CONV_t$) of the conversation may be derived as a function of conversation at timeframe 't', as shown in the equation below:

$$l(CONV_T) = f(CONV_T)$$

where,
($CONV_T$) denotes that the conversation in timeframe 't'; and
l($CONV_T$) denotes intent of conversation in timeframe 't'.

In some embodiments, the probability of achieving the objective may be formulated as the summation of time dependent function, as shown in the equation below:

$$\rho = \sum_{t}^{T} (f_t(I(CONV_t)))$$

where,
$f_t$ is a temporal (time dependent) function for calculating probability of achieving the end objective from a call The analyzing module 206 may further suggest the template $TMPL_{i, t+1}$ for intent 'i' where i∈l (l is the complete set of possible intents) and t+1 is next timeframe.

The probability of achieving the end objective may be integrated in to the call distribution policy module 216. The call distribution policy module 216 may include an optimized call distribution policy. The call distribution policy module 216 may assign one or more callees to each caller for sales calls, based on the optimized call distribution policy.

Figure 4:
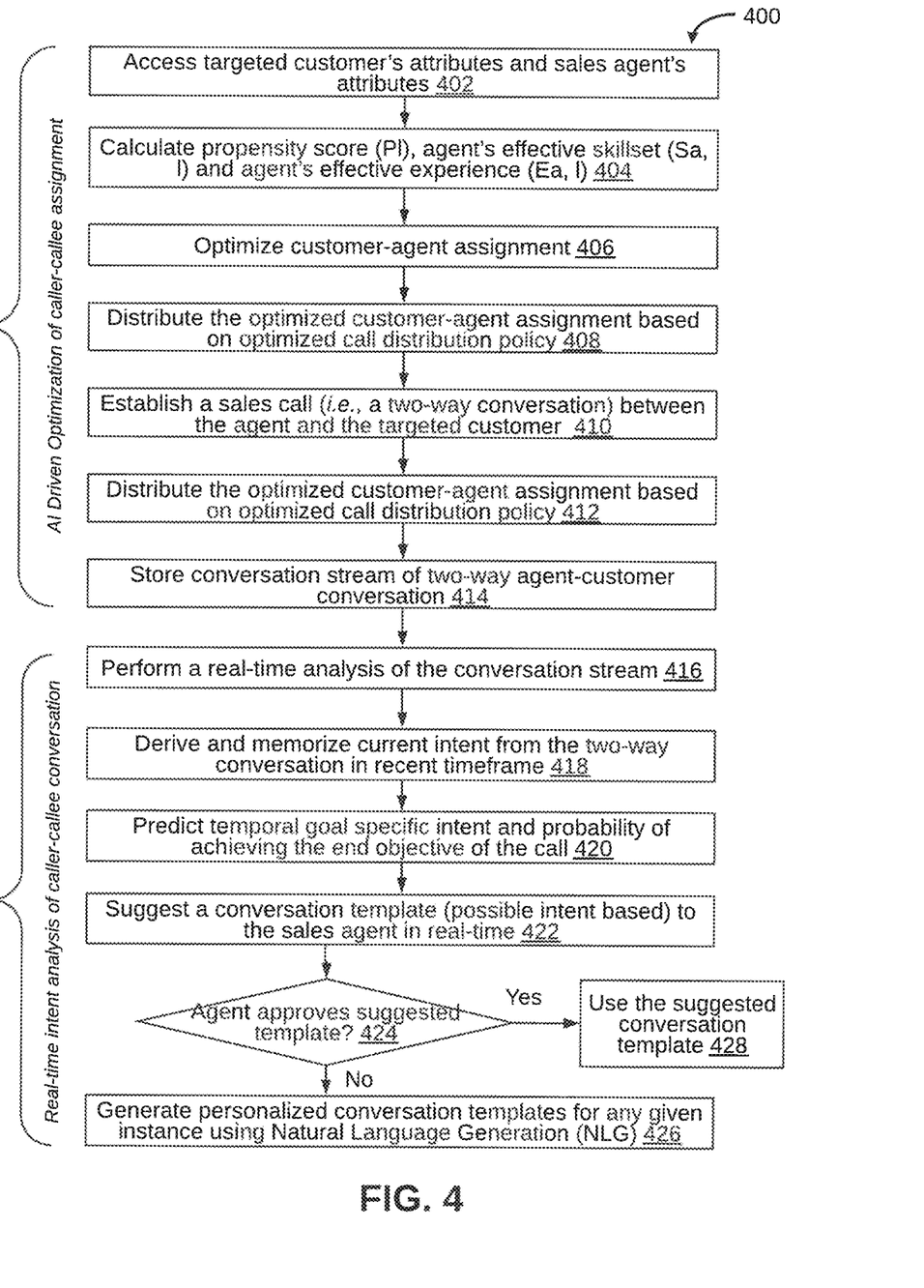
FIG. 4 is a flowchart of a detailed method for optimizing call distribution among callers for improved positive outcome, in accordance with an embodiment.

Referring now to FIG. 4, a flowchart 400 of a detailed method of optimizing call distribution among callers for improved positive outcome is illustrated, in accordance with an embodiment. At step 402 a customer's (callee's) attributes and agent's (caller's) attributes 402 may be accessed. At step 404, a propensity score ($P_l$), an agent's effective skillset ($S_{a,l}$) and an agent's effective experience ($E_{a,l}$) may be calculated. At step 406, a customer-agent assignment 406 may be optimized. At step 408, the optimized customer-agent assignment may be distributed based on optimized call distribution policy. At step 410, a sales call (i.e., a two-way conversation) may be established between the agent and the customer. At step 412, the optimized customer-agent assignment may be distributed based on optimized call distribution policy. At step 414, the conversation stream of two-way conversation may be stored. At step 416, a real-time analysis of the conversation stream may be performed. At step 418, a current intent from the two-way conversation in a recent timeframe may be derived and memorized. At step 420, a temporal goal specific intent and a probability of achieving an end objective of the sales call may be predicted. At step 422, a conversation template may be suggested to the agent in real-time. At step 424, a check may be performed to determine if the agent approves suggested conversation. At step 426, a personalized conversation template may be generated for any given instance using Natural Language Generation (NLG). At step 428, the suggested conversation template 428 may be used by the agent.

At step 402 the customer's attributes and agent's attributes 402 may be accessed. As mentioned earlier, the customer's attributes and sales agent's attributes may include customer information, agent information, historical data of previous conversations between agents and customers, customer behavior patterns, agent behavior patterns, and dialogues of the agents in previous conversations. At step 404, the propensity score ($P_l$), the agent's effective skillset ($S_{a,\ l}$) and the agent's effective experience ($E_{a,\ l}$) may be calculated using the customer's attributes and the agent's attributes. In some embodiments, the propensity score ($P_l$), the agent's effective skillset ($S_{a,\ l}$) and the agent's effective experience ($E_{a,\ l}$) may be calculated by the analyzing module 206, for the purpose of determining cost of customer acquisition.

At step 406, the customer-agent assignment 406 may be optimized. The assignment of the agent to the customer may be optimized using the propensity score ($P_l$), the agent's effective skillset ($S_{a,\ l}$) and the agent's effective experience ($E_{a,\ l}$). The analyzing module 206 may optimize the customer-agent by minimizing cost of the customer acquisition. In some embodiments, the AI model 214 may minimize the overall cost by summing over all the agents and customers. It may be noted that a stochastic policy (not deterministic rule set) of agent assignment may be created. At step 408, the optimized customer-agent assignment may be distributed based on optimized call distribution policy. At step 410, a sales call (i.e., a two-way conversation) may be established between the agent and the targeted customer 410. For example, the agent may establish the sales call with a customer based on optimized call distribution. At step 412, the optimized customer-agent assignment may be distributed based on optimized call distribution policy 412. At step 414, the conversation stream of the two-way conversation may be stored. The conversation stream may be recorded, and stored in a storage medium for future training and analysis purpose.

At step 416, a real-time analysis of the conversation stream may be performed. In some embodiment, the analyzing module 206 may perform a real-time analysis of the conversation stream using a memory-based Neural Network and Natural Language Processing (NLP). By way of an example, the memory based neural network may include an attention based Short-Term Memory Network (LSTM). It may be noted that the analyzing module 206 may be constructed by leveraging an attention-based memory network. At step 418, a current intent from the two-way conversation in recent timeframe may be derived and memorized. It may be understood that the conversation may continue over multiple small long timeframes. Further, the conversation may have temporal dependences. At step 420, the temporal goal specific intent and a probability of achieving the end objective of the call may be predicted. The memory based Neural Network may process the conversation stream and predict temporal goal-specific intents of the conversation. These temporal goal-specific intents may be used to calculate the probability of achieving the end objective of the call based on the intent of the conversation. It may be noted that the end objective may be an outcome that the customer buys a product from the agent.

At step 422, a conversation template (possible intent based) may be suggested to the sales agent in real-time 422. In some embodiments, the conversation template recommendation module 316 may suggest the conversation template (possible intent based) to the agent in real-time, based on the temporal goal-specific intent and the probability. The suggested conversation template may be provided to the agent to steer conversation with the targeted customer. At step 424, a check may be performed to determine if the agent approves the suggested conversation template. If at step 424, it is determined that the agent approves the suggested conversation template, the method may proceed to step 426.

At step 426, the suggested conversation template may be used by the agent in conversation with the customer. However, if at step 424, it is determined that the agent does not approve the suggested conversation template, the method may proceed to step 428 ("No" path). At step 428, the conversation may be improved based on changes in the temporal goal-specific intent and probability score after the next timestep of the conversation batch processing (suggested feedback loop). In some embodiments, the AI model 214 may learn and improve the conversation through an exploration vs exploitation dilemma. A reinforcement learning based AI driven assignment may take place. Further, personalized conversation templates may be generated based on the temporal goal-specific intents and the probability for any given instance, using Natural Language Generation (NLG). The personalized conversation template may be applicable for next timestep.

Figure 5:
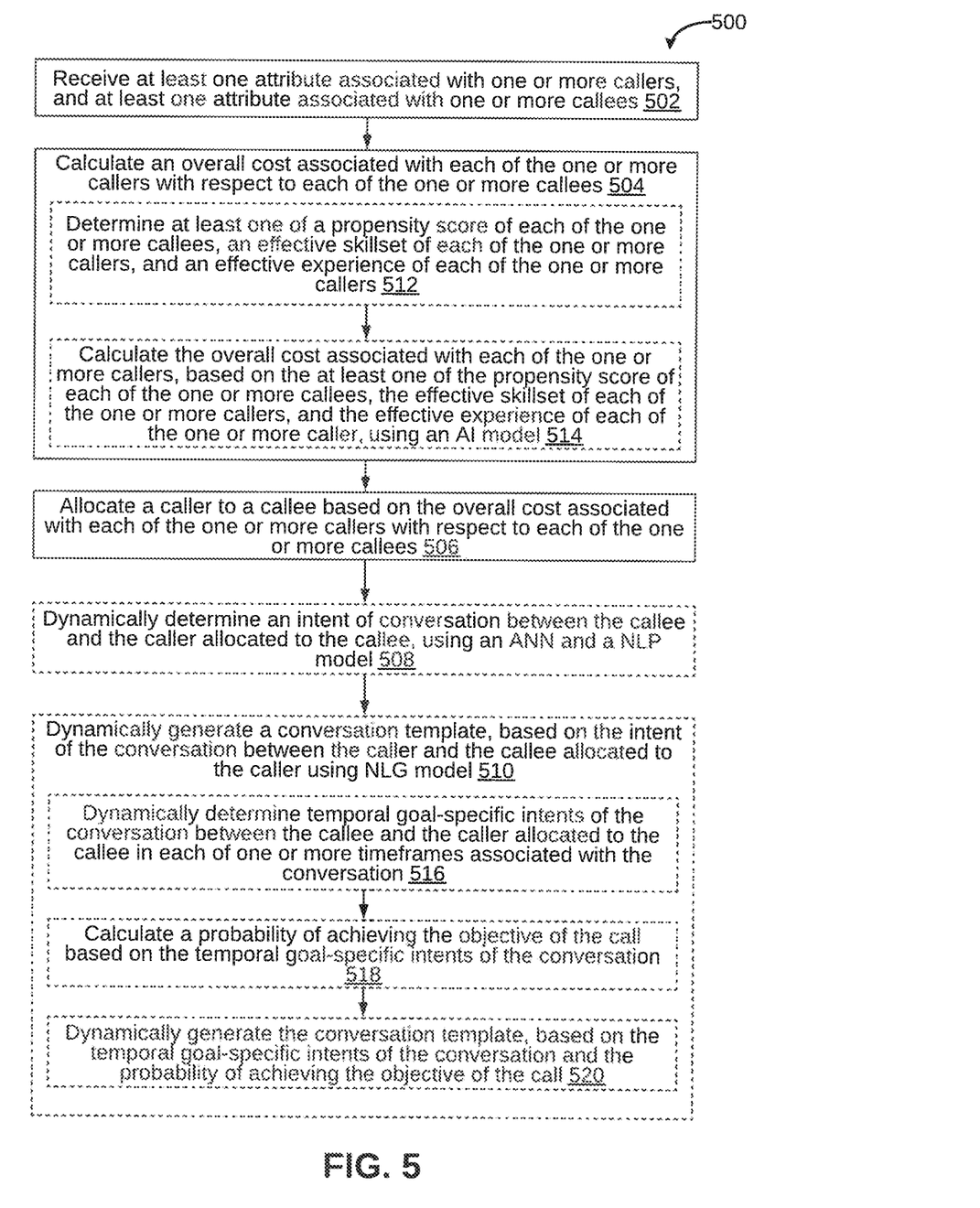
FIG. 5 is a flowchart of a method for optimizing call distribution among callers for improved positive outcome, in accordance with another embodiment.

Referring now to FIG. 5, a flowchart 500 of a method of optimizing call distribution among callers for improved positive outcome is illustrated, in, accordance with another embodiment. At step 502, at least one attribute associated with one or more callers (sales agents) and at least one attribute associated with one or more callees (targeted customers) may be received. At step 504, an overall cost associated with each of the one or more callers with respect to each of the one or more callees may be calculated based on the at least one attribute associated with the one or more callers and the at least one attribute associated with the one or more callees, using an Artificial Intelligence (AI) model. At step 506, a caller may be allocated to a callee based on the overall cost associated with each of the one or more callers with respect to each of the one or more callees. Additionally, at step 508, an intent of conversation may be dynamically determined between the callee and the caller allocated to the callee, using an Artificial Neural Network (ANN) and a Natural Language Processing (NLP) model. At step 510, a conversation template may be dynamically generated based on the intent of the conversation between the caller and the callee allocated to the caller, for assisting the caller in achieving an objective of the conversation, using Natural language Generation (NLG) model.

At step 502, at least one attribute associated with one or more callers and at least one attribute associated with one or more callees may be received. In some embodiments, the at least one attribute associated with the one or more callers and the at least one attribute associated with one or more callees may include callee information, caller information, historical data of previous conversations between callers and callees, callee behavior patterns, caller behavior patterns, and dialogues of the callers in previous conversations. At step 504, an overall cost associated with each of the one or more callers with respect to each of the one or more callees may be calculated based on the at least one attribute associated with the one or more callers and the at least one attribute associated with the one or more callees, using the AI model. In some embodiments, in order to calculate the overall cost, at step 512, at least one of a propensity score of each of the one or more callees, an effective skillset of each of the one or more callers, and an effective experience of each of the one or more callers may be determined. The propensity score, the effective skillset and the effective experience of each of the one or more callers may be determined based on the at least one attribute associated with the one or more callers and the at least one attribute associated with the one or more callees. Further, in such embodiments, at step 514, the overall cost associated with each of the one or more callers may be calculated based on the at least one of the propensity score, the effective skillset, and the effective experience of each of the one or more caller, using the AI model. In some embodiments, the AI model may be an Asynchronous Actor Critic Network model.

At step 506, a caller may be allocated to a callee based on the overall cost associated with each of the one or more callers with respect to each of the one or more callees. At step 508, an intent of conversation may be dynamically determined between the callee and the caller allocated to the callee, using an Artificial Neural Network (ANN) and a Natural Language Processing (NLP) model. In some embodiments, the ANN may be a Long Short-Term Memory Network (LSTM). It may be noted that the ANN may be trained with temporal goal-specific intents of the conversation dynamically determined between each of the one or more callers and the set of callees allocated to each of the one or more callers.

At step 510, a conversation template may be dynamically generated based on the intent of the conversation between the caller and the callee allocated to the caller, for assisting the caller in achieving an objective of the conversation, using Natural Language Generation (NLG) model. In some embodiment, in order to generate the conversation template, at step 516, temporal goal-specific intents of the conversation between the callee and the caller allocated to the callee may be dynamically determined. The goal-specific intents may be dynamically determined in each of one or more timeframes associated with the conversation. Once the goal-specific intents are determined, at step 518, a probability of achieving the objective of the call may be calculated based on the temporal goal-specific intents of the conversation. Further, at step 520, the conversation template may be dynamically generated based on the temporal goal-specific intents of the conversation and the probability of achieving the objective of the call.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
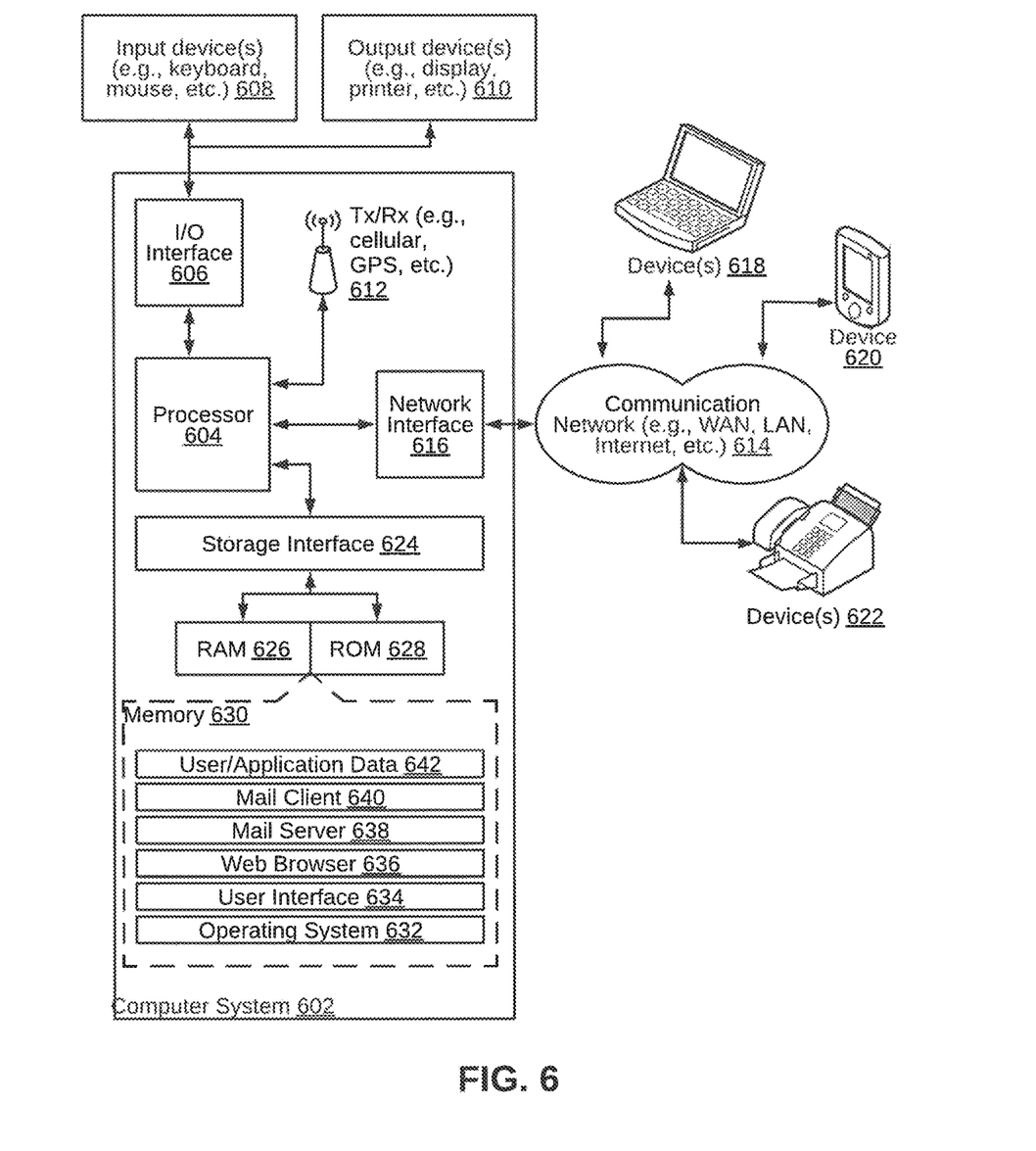
FIG. 6 illustrates a block diagram of an exemplary computer system for implementing various embodiments.

The disclosed methods and systems may be implemented on a conventional or a general-purpose computer system, such as a personal computer (PC) or server computer. Referring now to FIG. 6, a block diagram of an exemplary computer system 602 for implementing various embodiments is illustrated. Computer system 602 may include a central processing unit ("CPU" or "processor") 604. Processor 604 may include at least one data processor for executing program components for executing user or system-generated requests. A user may include a person, a person using a device such as such as those included in this disclosure, or such a device itself. Processor 604 may include specialized processing units such as integrated system (bus) controllers, memory management control units, floating point units, graphics processing units, digital signal processing units, etc. Processor 604 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM processor, XEON® processor, CELERON® processor or other line of processors, etc. Processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via an I/O interface 606. I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (COMA), high-speed packet access (HSPA+), global system for mobile communications (GSM), long-term evolution (LTE), WiMax, or the like), etc.

Using I/O interface 606, computer system 602 may communicate with one or more I/O devices. For example, an input device 608 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 610 may be a printer, fax machine, video display (for example, cathode ray tube (CRT), liquid crystal display (LCD), light-emitting diode (LED), plasma, or the like), audio speaker, etc. In some embodiments, a transceiver 612 may be disposed in connection with processor 604. Transceiver 612 may facilitate various types of wireless transmission or reception. For example, transceiver 612 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 604 may be disposed in communication with a communication network 614 via a network interface 616. Network interface 616 may communicate with communication network 614. Network interface 616 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 614 may include, without limitation, a direct interconnection, local area network (LAN), wide area network (WAN), wireless network (for example, using Wireless Application Protocol), the Internet, etc. Using network interface 616 and communication network 614, computer system 602 may communicate with devices 618, 620, and 622. These devices may include, without limitation, personal computer(s), server(s), fax machines, printers, scanners, various mobile devices such as cellular telephones, smartphones (for example, APPLE® (PHONE® smartphone, BLACKBERRY® smartphone, ANDROID® based phones, etc.), tablet computers, eBook readers (AMAZON® KINDLE® e-reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 602 may itself embody one or more of these devices.

In some embodiments, processor 604 may be disposed in communication with one or more memory devices (for example, RAM 626, ROM 628, etc.) via a storage interface 624. Storage interface 624 may connect to memory 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 630 may store a collection of program or database components, including, without limitation, an operating system 632, user interface 634, web browser 636, mail server 638, mail client 640, user/application data 642 (for example, any data variables or data records discussed in this disclosure), etc. Operating system 632 may facilitate resource management and operation of computer system 602. Examples of operating systems 632 include, without limitation, APPLE® MACINTOSH® OS X platform, UNIX platform, Unix-Ike system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 634 may facilitate display, execution, interaction, manipulation, or operation of program components through textual or graphical facilities. For example, user interfaces may provide computer interaction interface elements on a display system operatively connected to computer system 602, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 602 may implement a web browser 636 stored program component. Web browser 636 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 602 may implement a mail server 638 stored program component. Mail server 638 may be an Internet mail server such as MICROSOFT® EXCHANGE® mail server, or the like. Mail server 638 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 638 may utilize communication protocols such as internet message access protocol (IMAP), messaging application programming interface (MAPI), Microsoft Exchange, post office protocol (POP), simple mail transfer protocol (SMTP), or the like. In some embodiments, computer system 602 may implement a mail client 640 stored program component. Mail client 640 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 602 may store user/application data 642, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller, Hence, references to specific functional units are only to be seen as references to suitable means for providing the described functionality, rather than indicative of a strict logical or physical structure or organization.

As will be appreciated by those skilled in the art, the techniques described in the various embodiments discussed above pertain to optimizing call distribution among callers for improved positive outcome. For example, the techniques may be used to optimize a sales agent assignment to a targeted customer in tele-marketing. An attention based Neural Network may be used for calculating a propensity score of customer, an effective skillset of a caller, and an effective experience of the caller. The techniques may optimize the stochastic nature of a sales call based on the propensity score of a callee, an effective skillset of a caller, and an effective experience of the caller. The techniques further perform a real-time intent analysis of caller-callee conversations (for example, using Long Short-Term Memory Network (LSTM) and Natural language Processing (NLP) for predicting temporal goal-specific intents of the conversations and a probability of achieving end objective of a sales call based on the intents. Further, the techniques provide for generating suggestions on conversation template to the callers in real-time, and providing a personalized conversation template for any given instance using Natural Language Generation (NLG).

The above techniques, therefore, provide for optimizing allocation of a caller to a callee thereby overcoming stochasticity associated with calls. By way of optimized policy-based allocation of callers (unlike rule/tag-based allocation), the techniques lead to an overall increase in profits for the organization. Further, by providing personalized conversation suggestion templates, the techniques help the callers in communicating more effectively with the callees, thereby improving the overall business process.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of optimizing call distribution among callers for improved positive outcome, the method comprising:
   receiving, by a call distribution optimization device, at least one attribute associated with one or more callers, and at least one attribute associated with one or more callees;
   calculating, by the call distribution optimization device, an overall cost associated with each of the one or more callers with respect to each of the one or more callees, based on the at least one attribute associated with the one or more callers and the at least one attribute associated with the one or more callees, using an Artificial Intelligence (AI) model; and
   allocating, by the call distribution optimization device, a caller to a callee based on the overall cost associated with each of the one or more callers with respect to each of the one or more callees.

2. The method of claim 1, wherein the at least one attribute associated with the one or more callers and the at least one attribute associated with one or more callees comprise callee information, caller information, historical data of previous conversations between callers and callees, callee behavior patterns, caller behavior patterns, and dialogues of the callers in previous conversations.

3. The method of claim 1, wherein calculating the overall cost comprises:
   determining at least one of a propensity score of each of the one or more callees, an effective skillset of each of the one or more callers, and an effective experience of each of the one or more callers, based on the at least one attribute associated with the one or more callers and the at least one attribute associated with the one or more callees; and
   calculating the overall cost associated with each of the one or more callers, based on the at least one of the propensity score of each of the one or more callees, the effective skillset of each of the one or more callers, and the effective experience of each of the one or more caller, using the AI model.

4. The method of claim 1 further comprising:
   dynamically determining an intent of conversation between the callee and the caller allocated to the callee, using an Artificial Neural Network (ANN) and a Natural Language Processing (NLP) model; and
   dynamically generating a conversation template, based on the intent of the conversation between the caller and the callee allocated to the caller, for assisting the caller in achieving an objective of the conversation, using Natural Language Generation (NLG) model.

5. The method of claim 4, wherein dynamically generating the conversation template further comprises:
   dynamically determining temporal goal-specific intents of the conversation between the callee and the caller allocated to the callee in each of one or more timeframes associated with the conversation;
   calculating a probability of achieving the objective of the call based on the temporal goal-specific intents of the conversation; and
   dynamically generating the conversation template, based on the temporal goal-specific intents of the conversation and the probability of achieving the objective of the call.

6. The method of claim 4, wherein the ANN is a Long Short-Term Memory Network (LSTM).

7. The method of claim 6, wherein the ANN is trained with the temporal goal-specific intents of the conversation dynamically determined between each of the one or more callers and the set of callees allocated to each of the one or more callers.

8. The method of claim 1, wherein the AI model is an Asynchronous Actor Critic Network model.

9. A call distribution optimization device for optimizing call distribution among callers for improved positive outcome, the call distribution optimization device comprising:
   a processor; and
   a memory communicatively coupled to the processor, wherein the memory stores processor-executable instructions, which, on execution, cause the processor to:
      receive at least one attribute associated with one or more callers, and at least one attribute associated with one or more callees;
      calculate an overall cost associated with each of the one or more callers with respect to each of the one or more callees, based on the at least one attribute associated with the one or ore callers and the at least one attribute associated with the one or more callees, using an Artificial Intelligence (AI) model; and
      allocate a caller to a callee based on the overall cost associated with each of the one or more callers with respect to each of the one or more callees.

10. The call distribution optimization device of claim 9, wherein the at least one attribute associated with the one or more callers and the at least one attribute associated with one or more callees comprise callee information, caller information, historical data of previous conversations between callers and callees, callee behavior patterns, caller behavior patterns, and dialogues of the callers in previous conversations.

11. The call distribution optimization device of claim 9, wherein calculating the overall cost comprises:
- determining at least one of a propensity score of each of the one or more callees, an effective skillset of each of the one or more callers, and an effective experience of each of the one or more callers, based on the at least one attribute associated with the one or more callers and the at least one attribute associated with the one or more callees; and
- calculating the overall cost associated with each of the one or more callers, based on the at least one of the propensity score of each of the one or more callees, the effective skillset of each of the one or more callers, and the effective experience of each of the one or more caller, using the AI model.

12. The call distribution optimization device of claim 9, wherein the processor-executable instructions, on execution, further cause the processor to:
- dynamically determine an intent of conversation between the callee and the caller allocated to the callee, using an Artificial Neural Network (ANN) and a Natural Language Processing (NLP) model; and
- dynamically generate a conversation template, based on the intent of the conversation between the caller and the callee allocated to the caller, for assisting the caller in achieving an objective of the conversation, using Natural Language Generation (NLG) model.

13. The call distribution optimization device of claim 12, wherein dynamically generating the conversation template further comprises:
- dynamically determining temporal goal-specific intents of the conversation between the callee and the caller allocated to the callee in each of one or more timeframes associated with the conversation;
- calculating a probability of achieving the objective of the call based on the temporal goal-specific intents of the conversation; and
- dynamically generating the conversation template, based on the temporal goal-specific intents of the conversation and the probability of achieving the objective of the call.

14. The call distribution optimization device of claim 12, wherein the ANN is a Long Short-Term Memory Network (LSTM), and wherein the ANN is trained with the temporal goal-specific intents of the conversation dynamically determined between each of the one or more callers and the set of callees allocated to each of the one or more callers.

15. The call distribution optimization device of claim 9, wherein the AI model is an Asynchronous Actor Critic Network model.

16. A non-transitory computer-readable storage medium having stored thereon, a set of computer-executable instructions causing a computer comprising one or more processors to perform steps comprising:
- receiving at least one attribute associated with one or more callers, and at least one attribute associated with one or more callees;
- calculating an overall cost associated with each of the one or more callers with respect to each of the one or more callees, based on the at least one attribute associated with the one or more callers and the at least one attribute associated with the one or more callees, using an Artificial Intelligence (AI) model; and
- allocating a caller to a callee based on the overall cost associated with each of the one or more callers with respect to each of the one or more callees.

* * * * *